United States Patent [19]

Miller et al.

[11] Patent Number: 4,620,838
[45] Date of Patent: Nov. 4, 1986

[54] CHEESE SHREDDER

[75] Inventors: Roland E. Miller, Lena; Henry Borgardt, Chicago; John Valek, Cicero, all of Ill.

[73] Assignee: Kraft, Inc., Glenview, Ill.

[21] Appl. No.: 594,204

[22] Filed: Mar. 28, 1984

[51] Int. Cl.$^4$ ............................................. B29C 47/54
[52] U.S. Cl. ................................... 425/135; 425/306; 425/308; 425/316; 425/376 R; 425/437; 425/464
[58] Field of Search ............... 83/404.3, 212.1, 437, 83/425.1; 425/405 R, 97, 107, 135, 139, 149, 306, 308, 310, 316, 376 R, 437, 461, 39, 464; 264/335

[56] References Cited

U.S. PATENT DOCUMENTS

| | | | |
|---|---|---|---|
| 608,016 | 7/1898 | Anderson | 83/408 |
| 828,397 | 8/1906 | Friday | 83/425.1 |
| 886,088 | 4/1908 | Stewart | 425/308 |
| 949,929 | 2/1910 | Hart | 83/212.1 |
| 1,145,557 | 7/1915 | Cole | 83/425.1 |
| 1,846,423 | 2/1932 | Harrington | 83/408 |
| 2,299,092 | 10/1942 | Johnson | 83/437 |
| 2,307,034 | 1/1943 | Gaenzle | 425/97 |
| 2,307,055 | 1/1943 | Menger et al. | 425/97 |
| 2,454,421 | 11/1948 | Anderson | 83/212.1 |
| 2,692,430 | 10/1954 | Kraft et al. | 83/437 |
| 2,762,319 | 9/1956 | Simmons et al. | 425/308 |
| 2,904,830 | 9/1959 | Mulrooney | 425/376 R |
| 3,067,468 | 12/1962 | Kelley et al. | 425/308 |
| 3,090,075 | 5/1963 | Provenzano et al. | 425/308 |
| 3,344,752 | 10/1967 | Ilines | 425/308 |
| 3,463,211 | 8/1969 | Holz | 83/404.3 |
| 3,506,046 | 4/1970 | Webb | 83/404.3 |
| 3,776,073 | 12/1973 | Runge | 83/212.1 |
| 3,883,278 | 5/1975 | Hass | 425/149 |
| 4,051,757 | 10/1977 | Reifenhäuser et al. | 83/404.3 |
| 4,382,969 | 5/1983 | Sadler | 426/272 |

OTHER PUBLICATIONS

Brochure on "Holac HA 121 Dicer".
Brochure on "Holac Fully Automatic Dicer".

Primary Examiner—Willard E. Hoag
Attorney, Agent, or Firm—Fitch, Even, Tabin & Flannery

[57] ABSTRACT

Apparatus for providing cheese shapes utilize one or more chambers for containing cheese, a ram for forcing the cheese through a perforated area of a die plate at the forward end of each chamber to produce a plurality of extrusions, and a cutter to divide each extrusion into a plurality of shapes.

13 Claims, 12 Drawing Figures

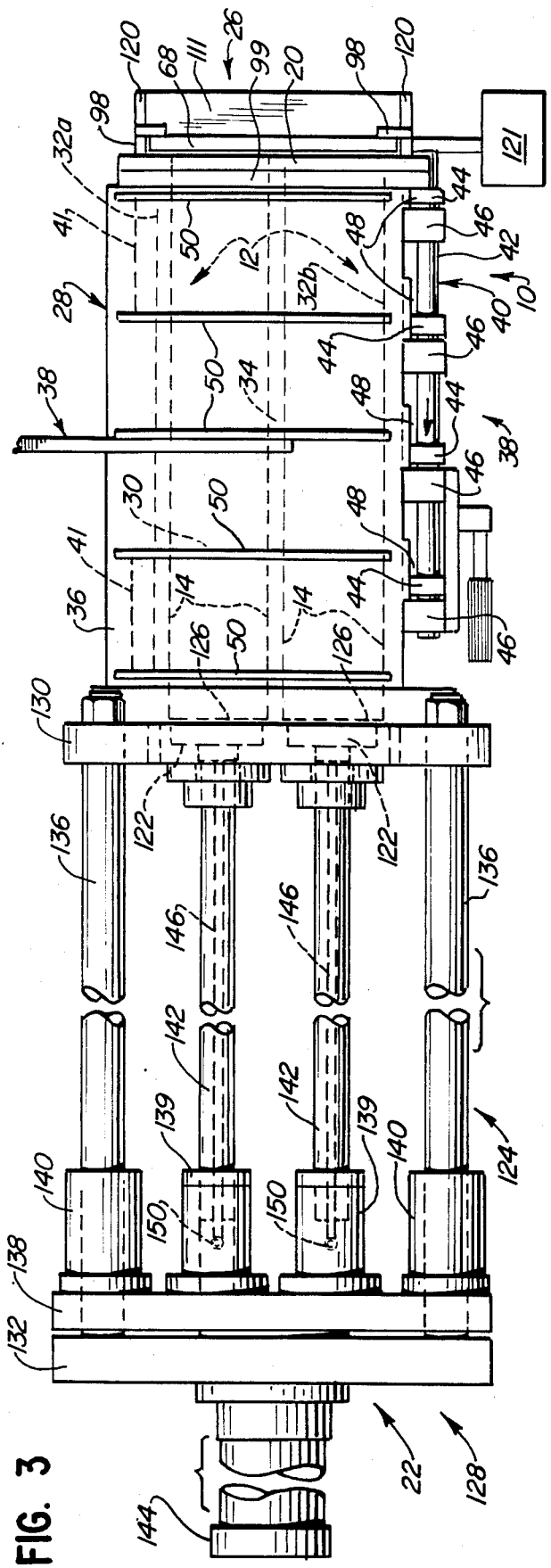
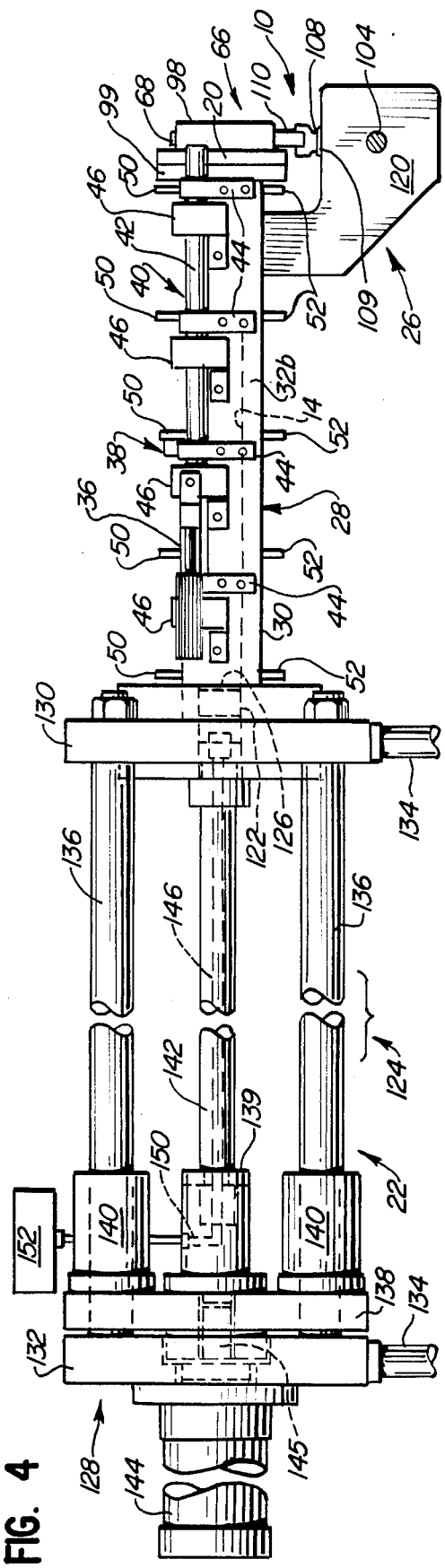
FIG. 3
FIG. 4

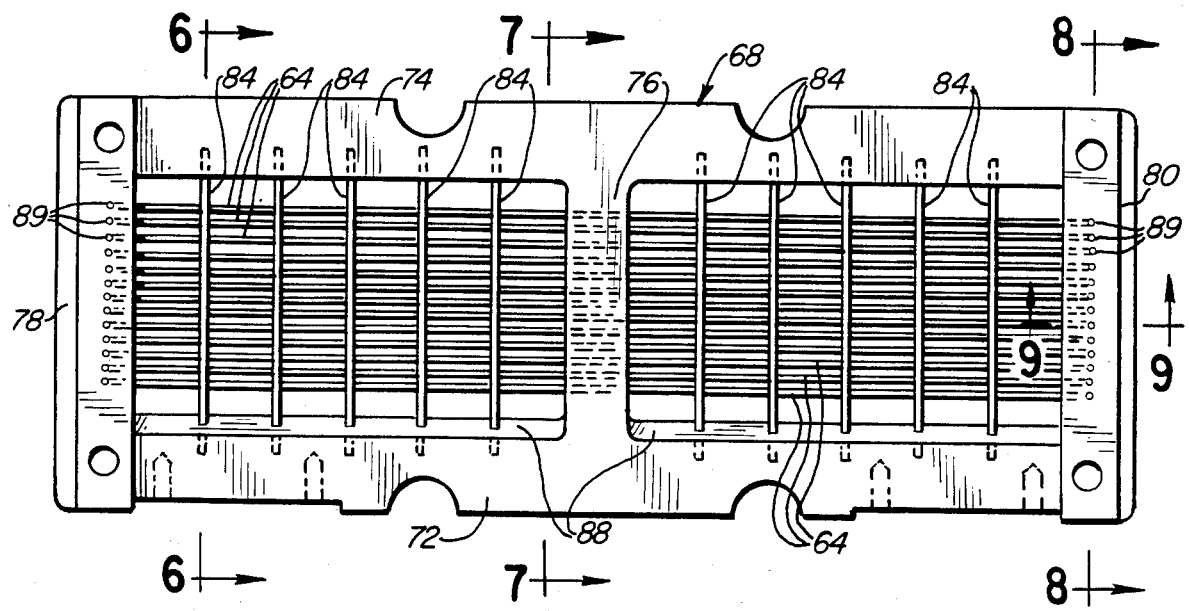
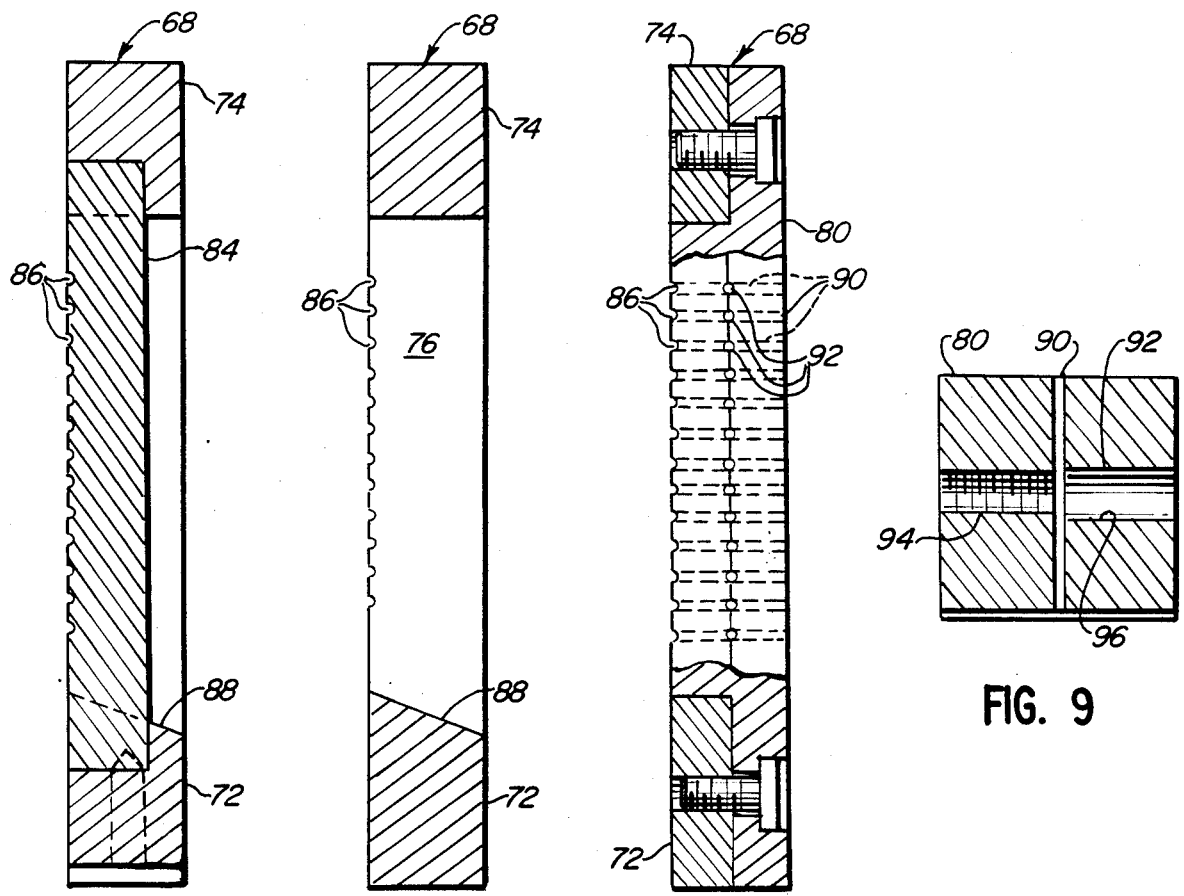

CHEESE SHREDDER

BACKGROUND OF THE INVENTION

The present invention relates generally to a method and apparatus for providing shreds or shapes of cheese, and more particularly to the use of extrusion apparatus for forming a plurality of shreds or shapes of predetermined size.

Shredded cheese, or cheese in the form of elongated shreds or other shapes, is used in the preparation of various types of food. It may be preferable for certain markets that the shreds be of approximately uniform size and weight, and be on the order of one inch in length.

Cheese is generally manufactured in relatively large blocks and cut for sale into smaller blocks or chunks of shapes and sizes selected according to consumer preference. For example, cheese may be sold in cylindrical or rectangular shapes, or in sliced form. The cutting operation leaves a quantity of irregular pieces of cheese not suitable for consumer sale in desirably shaped forms. An ongoing goal in the cheese industry is to find commercially profitable uses for such pieces. The present invention relates to extrusion apparatus which is particularly suitable for forming irregular pieces of cheese into elongated shreds of predetermined dimensions.

In the past, attempts to produce shredded cheese by extrusion have not been entirely successful. One problem has been that variation in the rate of extrusion across the width of an extrusion die has caused lack of uniformity among the shreds. Another problem has been that working of the cheese during extrusion has caused maceration and oiling off. "Maceration" is a softening of the texture of the cheese due to a breakdown of the cheese structure. "Oiling off" is a separation of oil from the other constituents of the cheese. Both are undesirable and inhibit the formation of desired shreds.

SUMMARY OF THE INVENTION

In accordance with the present invention, extrusion apparatus is provided for forming a quantity of cheese into a plurality of approximately uniformly shaped pieces such as relatively small shreds of predetermined configuration without substantial damage to the cheese due to working and pressure. The apparatus includes one or more chambers for holding the cheese having smooth longitudinal interior surfaces for slidably engaging the cheese. At the forward end of each chamber is a perforated area of a die plate. A ram is provided to force the cheese forwardly of its chamber through the perforations or openings in the die plate to form a plurality of extrusions of predetermined cross section. A cutter assembly is positioned forwardly of the die plate adjacent thereto to cut through the extrusions at a predetermined frequency as they emerge from the openings in the die plate and divide each extrusion into a plurality of discrete segments, each having a predetermined dimension in the direction of extrusion.

In accordance with one feature of the present invention, the perimeter surfaces of the openings about the perimeter of the perforated area of the die plate are substantially aligned with the longitudinal surfaces of the chamber.

In accordance with another feature of the present invention, the apparatus is operative to produce shreds which are generally rectangular solids, and are extruded through generally rectangular openings dimensioned so that the widths of the openings define the lengths of the shreds.

It is a general object of the present invention to provide a method and apparatus for forming a quantity of cheese into a plurality of approximately uniform, relatively small shreds of predetermined configuration without causing maceration and oiling off.

Further features and objects of the present invention are set forth in the following description and the accompanying illustrations.

BRIEF DESCRIPTION OF THE DRAWINGS

FIG. 3 is a foreshortened plan view of the apparatus of FIG. 1.

FIG. 4 is a foreshortened side elevational view of the apparatus of FIG. 1.

FIG. 5 is a front elevational view of the cutter frame of the apparatus of FIG. 1.

FIG. 6 is an enlarged sectional elevational view taken substantially along line 6—6 in FIG. 5 and looking in the direction of the arrows.

FIG. 7 is an enlarged sectional elevational view taken substantially along line 7—7 in FIG. 5 and looking in the direction of the arrows.

FIG. 8 is an enlarged sectional elevational view taken substantially along line 8—8 in FIG. 5 and looking in the direction of the arrows.

FIG. 9 is an enlarged sectional view taken substantially along line 9—9 in FIG. 5 and looking in the direction of the arrows.

DESCRIPTION OF THE PREFERRED EMBODIMENT

The present invention is generally embodied in extrusion apparatus, indicated generally at 10, for forming a quantity of cheese or the like into a plurality of approximately uniform, relatively small pieces or shreds of predetermined configuration. The preferred embodiment of the invention is particularly suitable for use in producing cheese shreds from a block of cheese formed from a number of smaller pieces or fragments, such as trim.

Figure 2:
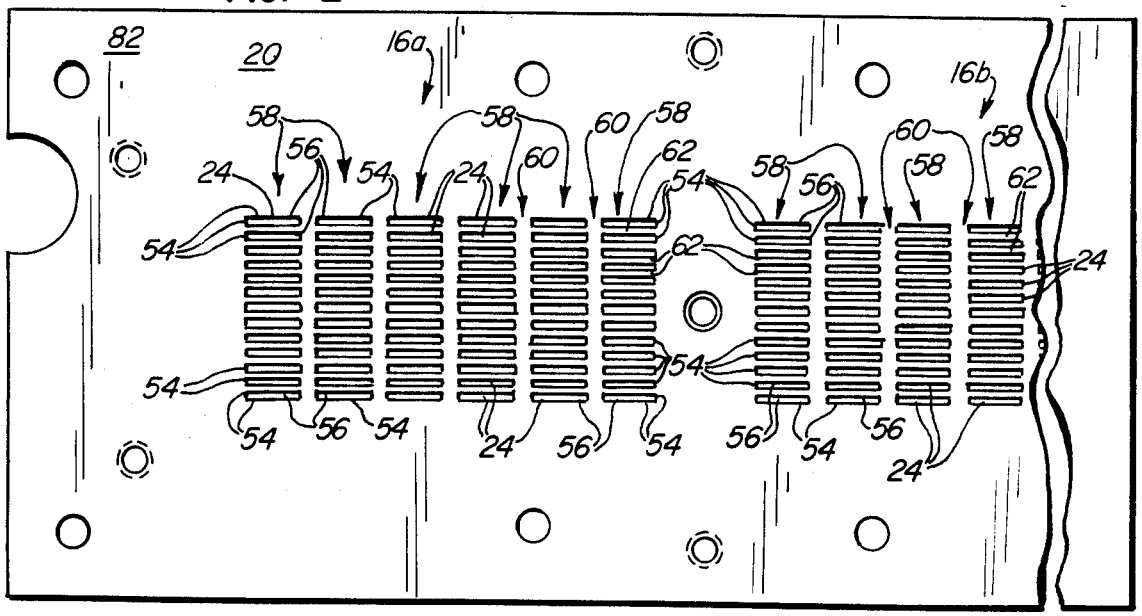
FIG. 2 is a foreshortened front elevational view of a die plate for the extrusion apparatus of FIG. 1, shown on an enlarged scale.

The apparatus includes one or more chambers 12 for holding cheese prior to forming shreds. The interior of each chamber is defined by longitudinal surfaces 14 for slidably engaging the cheese. At the forward end of each chamber is a perforated area 16a, 16b of a die plate 20 defined by a plurality of perforations or openings 24 (FIG. 2). A ram assembly 22 is provided to force the cheese forwardly of the chambers 12 through the perforations or openings 24 in the die plate 20 to form a plurality of extrusions of predetermined shape. A cutter assembly 26 is positioned forwardly of the die plate 20 and adjacent thereto to cut through the extrusions at a predetermined frequency as they emerge from the openings 24 in the die plate 20 and divide each extrusion into a plurality of discrete segments each having a predetermined dimension in the direction of extrusion.

In the illustrated embodiment, the extrusion apparatus 10 includes two chambers 12 of generally rectangular cross section disposed adjacent one another in an integral structure, indicated generally at 28. It will be appreciated that other cross-sectional configurations might be employed for the chambers 12 without departing from the scope of the invention. The structure 28 includes a bottom wall 30 spanning both chambers 12, a pair of side walls 32a, 32b extending upwardly from the bottom wall 30 and disposed substantially parallel to one another, a middle wall 34 extending generally parallel to the side walls 32a, 32b between the chambers 12, and a cover 36 spanning the width and length of the structure 28. To enable loading of cheese into the respective chambers 12, the cover 36 is movable between an open position and a closed position. Suitable means 38 are provided for opening and closing the cover, and locking means 40 are provided for securing it in a closed position so that internal pressure generated during extrusion will not force it open.

The cover 36 is preferably mounted on hinges 41 (FIG. 3) on one of the side walls 32a, and the preferred locking means 40 comprises a locking pin 42 slidably supported in openings formed in lugs 44 fixed to the opposite side wall 32b of the structure 28 and having locking means 46 fixedly mounted on it to engage ears 48 (FIG. 3) on the cover 36. Locking or unlocking of the cover 36 may be accomplished relatively easily by sliding the pin 42 over a relatively short stroke.

Reinforcing ribs 50 may be provided to stiffen the cover. As illustrated in FIG. 4, ribs 52 may also be provided to reinforce the bottom wall 30 of the structure 28 to reduce flexure under pressure.

It is desirable that the friction exerted on the cheese by the die plate 20 as the cheese passes therethrough be sufficient to enable pressure to be generated within the chambers 12 by the ram assembly 22 so that a plurality of small pieces of cheese may be compressed together within the chambers 12 so as to form an integral block or stick of cheese. This enables integral shreds to be produced from a plurality of small pieces of cheese. However, the development of excessive pressure on the cheese within the chamber has posed difficulties in the development of extrusion apparatus for forming cheese shreds. Thus, one of the objectives in the development of this apparatus has been to reduce the pressure on the cheese prior to its extrusion through the die plate. Another objective has been to reduce working of the cheese within the chamber.

In accordance with the present invention, a method and apparatus are provided for forming a quantity of cheese into a plurality of approximately uniform, relatively small shreds of predetermined configuration without substantial damage to the cheese. This is achieved in the present invention by configuring the die plate 20 and chambers 12 so as to enable approximately uniform cheese velocity to be maintained across the entire area of each of the perforated areas 16a, b of the die plate 20 and reduce pressure on and working of the cheese as compared with earlier proposed designs. To this end, each of the perimeter surfaces 54 of the perimeter openings 56 of the perforated areas 16 of the die plate 20 is substantially aligned with an adjacent longitudinal surface 14 of the adjacent chamber. This enables cheese sliding along the longitudinal surface 14 to be pushed directly through the perimeter openings 56.

Past attempts to produce elongated shreds of cheese by extrusion have involved extruding the shreds in the direction of their greatest dimension and cutting off the shreds at predetermined lengths. In accordance with the present invention, the openings 24 in the die plate 20 are configured so that the greatest dimension, or length, of each shred is determined by the greatest dimension of its associated die plate opening 24 rather than by the frequency of cutting of the extrusion. By configuring the openings 24 in the die plate so that each opening 24 defines the length and height, rather than the width and height, of its associated shreds, the surface area of cheese which contacts the edges of the die plate openings 24 is significantly reduced. This reduces the pressure on the cheese within the chambers 12 by reducing the resistance to the passage of the cheese through the die plate 20. This also enables shreds of substantially uniform length to be produced independently of the ram speed or cutter frequency since the width, rather than the length, of each shred is variable.

In the die plate 20 of the present inveniion, the configuration of the openings 24 and the spacing therebetween have been selected to provide enough resistance to the passage of cheese through the die plate to enable pressure to be maintained within the chamber to compact the cheese during extrusion without creating excessive pressure on the cheese or causing excessive working of the cheese. To this end, the perforated area 16a or 16b at the forward end of each chamber 12 is generally rectangular and coextensive with the generally rectangular cross-sectional area of its associated chamber 12, and the openings 24 defining the perforated areas 16a and 16b are generally rectangular in shape and are disposed in columns 58 with relatively narrow vertical spaces 60 between the columns 58 and with relatively narrow horizontal spaces 62 between adjacent openings in each column.

In the illustrated embodiment, the openings 24 in the respective perforated areas 16a and 16b are all of the same size. If desired, the openings 24 in one of the perforated areas 16a may be of one size while the openings 24 in the other perforated area 16b are of another size. Such differences in sizing may be desirable to enable the apparatus 10 to produce satisfactory shreds of two different types of cheese, where the different cheeses have different physical characteristics. Herein, the rectangular openings 24 in each perforated area 16a, 16b are disposed in six columns 58, each column containing 13 openings. The preferred openings 24 for making cheese shreds measure 0.125 in. $\times$ 0.770 in.

The cutter assembly 26 in the illustrated embodiment of the present invention includes a plurality of cutting elements 64 (FIG. 5) and means 66 for driving the cutting elements 64 in vertical reciprocating motion relative to the die plate 20. The preferred cutting elements are wires 64 which are supported by a frame 68 and extend generally horizontally thereacross. The frame 68 herein is generally rectangular and extends across the forward ends of both chambers 12 so that the extrusions emerging from the respective chambers 12 are cut simultaneously.

Referring particularly to FIGS. 5-8, the frame 68 herein includes a horizontal bottom member 72, a horizontal top member 74, a vertical center member 76 integrally connecting the top and bottom members 72 and 74, and vertical side members 78 and 80 at opposite sides of the frame 68 extending between the top and bottom members 72 and 74. The die plate 20 herein has a generally planar forward surface 82. It is desirable that the cutting wires 64 travel adjacent the forward surface 82 of the die plate 20 while separated therefrom by a relatively small distance along their cutting lengths so as to cut the shreds cleanly as they emerge from their associated openings 24. To this end, the cutting wires 64 are maintained under tension so that they will not flex substantially as they cut through the cheese shreds. Vertical stiffeners 84 may be disposed at spaced intervals along the frame 68 between the columns 58 of die plate openings 24 to support the wires 64 against deflection.

Each wire 64 is supported in an aligned series of notches 86 which are formed in the side members 78 of the frame 68 and stiffeners 84 adjacent the forward surface 82 of the die plate 20. The notches have depths slightly greater than the diameters of their associated wires 64. Thus, each wire 64 is supported at a plurality of locations along its length in a position directly adjacent the forward surface 82 of the die plate 20 without contacting the die plate 20, which could create undesirable friction and wear.

During normal operation of the extrusion apparatus 10, a conveyor or suitable receptacle (not shown) is positioned beneath the cutter frame 68 to receive shreds of cheese as they are produced. To prevent shreds from being retained on the bottom 72 of the cutter frame 68 as they drop downward, the bottom member 72 has an inclined upper surface 88 which slopes forwardly and downwardly beneath the wires 64 so that any shreds which contact it will tend to continue traveling downwardly.

To enable the tension on the wires 64 to be individually adjusted, each of the cutting wires 64 is individually secured at its opposite ends 89. A row of wire-receiving bores 90 is formed in each of the side frame members 78 and 80 for receiving the opposite ends 89 of the respective wires 64. As best seen in FIG. 9, each of the wire-receiving bores 90 intersects a transverse bore 92 which has a threaded portion 94 on one side of the wire-receiving bore 90 and an unthreaded portion 96 of slightly larger diameter on the opposite side of the wire-receiving bore 90. To secure an individual wire end 89 in place, the wire end 89 is inserted into the wire-receiving bore 90 so that it extends past the transverse bore 92, and a screw (not shown) is placed in the transverse bore 92 and tightened until the leading end of the screw presses against the wire 64 with sufficient force to retain it in place.

As the wires 64 cut through the cheese, they are urged forwardly by the forward movement of the cheese. To slidably support the frame 68 adjacent the die plate 20, a pair of gibs 98 are fixed to a mounting plate 99 at the forward end of the structure 28 at opposite sides of the frame 68, and a bracket 101 is fixed to the plate 99 so as to extend vertically across the center of the frame 68. The gibs 98 and bracket 99 engage the frame 68 in sliding contact to enable it to move vertically while restraining it against lateral movement.

Figure 10:
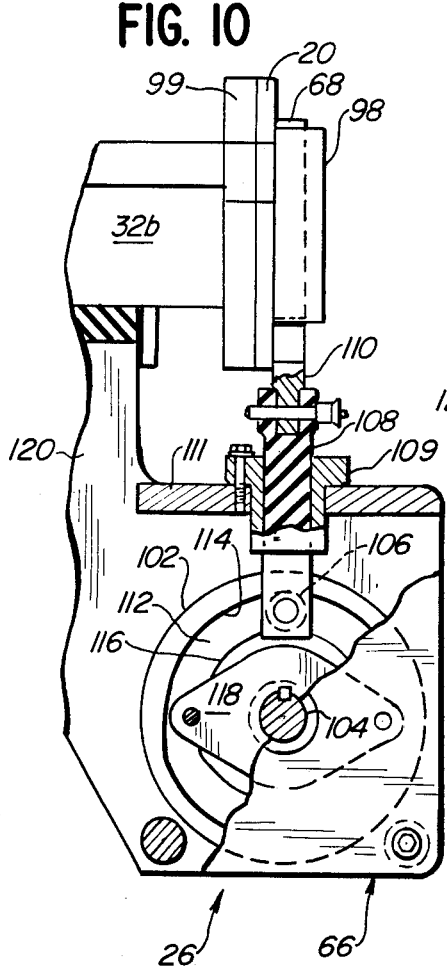
FIG. 10 is a side elevational view, with portions broken away for clarity, and with portions shown in section, of the cutter assembly of the apparatus of FIG. 1
Figure 11:
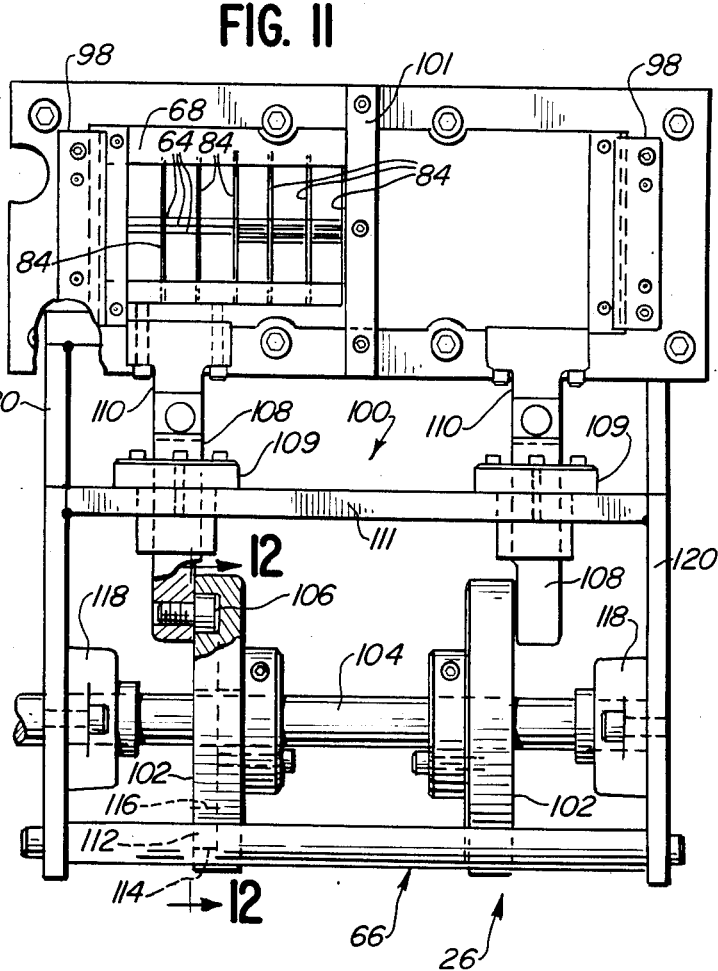
FIG. 11 is a front elevational view of the cutter assembly of FIG. 10.
Figure 12:
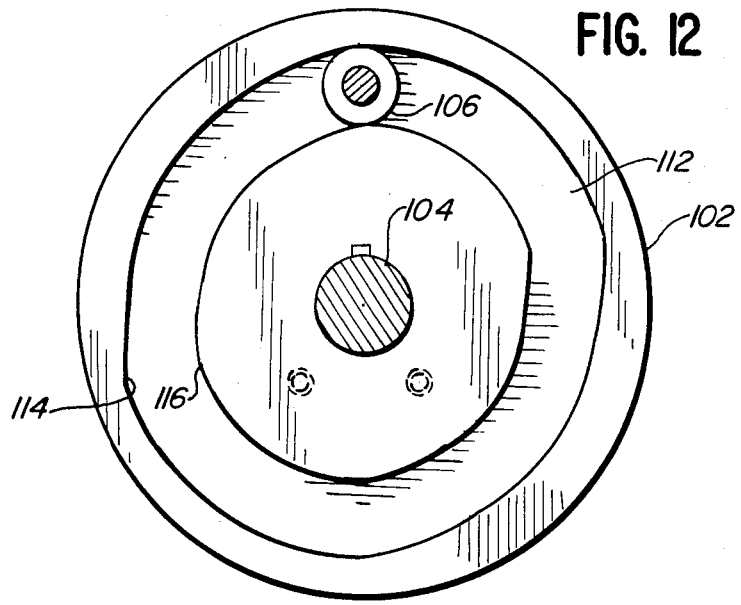
FIG. 12 is an enlarged sectional view taken substantially along line 12—12 in FIG. 11 and looking in the direction of the arrows.

The frame 68 herein is driven by a dual cam drive, indicated generally at 100 (FIG. 11), which includes a pair of cams 102 fixed to a rotating camshaft 104, a pair of cam followers 106, one associated with each cam 102 and driven thereby, and a pair of connector arms 108, one for each cam follower 106, which connect the cam followers 106 to the frame 68. As best seen in FIGS. 10 and 11, each of the connector arms 108 extends upwardly through a suitable guide 109 and is pinned to a lug 110, one of which is fixed to each side of the frame 68. The guides 109 are mounted on a support plate 111. The dual cam drive mechanism 100 thus applies balanced drive forces to the frame 68 through the connector arms 108.

To enable the cam drive 100 to exert both upward and downward force on the frame 68, the preferred cams are box cams 102, each having a channel or track 112 formed in one of its sides. The cam followers 106 are mounted for rotation about axes substantially parallel to the axis of the camshaft 104, and roll in the respective tracks 112. The cam followers 106 have diameters slightly smaller than the widths of their associated tracks 112 to enable rotating contact between the follower 106 and the track 112 with either the outer surface 114 or the inner surface 116 of the track 112 while permitting relatively little play. The tracks 112 are configured to give the cutter frame 68 relatively short, quick strokes so that the cuts made through the extrusions leave approximately vertical cut surfaces on the extrusions and form shreds of approximately rectangular cross-section.

The opposite ends of the camshaft 104 are journaled through suitable bearings 118 mounted on brackets 120 extending downwardly and forwardly at the forward end of the structure 28. To provide the power to rotate the camshaft 104, suitable means such as a variable speed motor and gear box assembly 121 (FIG. 3) are connected to the camshaft 104.

The ram assembly 22 preferably includes a pair of rams 122, one within each of the chambers 12, and ram drive means 124 for forcing the rams 122 longitudinally of the chambers 12 to push the cheese through the die plate 20. Each ram 122 is dimensioned to fit the interior of its associated chamber 12 and is movable longitudinally thereof. Each ram has a forward surface 26 for engaging the cheese.

In the preferred embodiment, the ram drive means 124 comprises a strain rod press positioned rearwardly of the chambers 12. The press includes a support frame 128 which includes forward and rearward end walls 130 and 132 respectively supported by vertical legs 134. Strain rods 136 extend generally horizontally of the frame 128 between the end walls 130 and 132 parallel to the chambers 12 and are secured to the end walls 130 and 132 to maintain predetermined spacing between the end walls 130 and 132 during operation of the press. The forward wall 130 has openings in it to accommodate the rams 122 and is affixed to the rearward end of the chamber structure 28.

A movable platen 138 is slidably supported for movement along the strain rods 136 by bushings 140, one on each of the strain rods 136. A pair of ram drive rods 142 are affixed at their rearward ends to the platen 138 by suitable mounts 139 and extend forward from the platen 138 to the rams 122. A hydraulic cylinder 144 fixed to the rear wall 132 and having a piston rod 145 extending through an opening in the rear wall 132 is used to push the platen 138 forwardly and thereby push the rams 122 forwardly.

The ram drive rods 142 herein are hollow, each having an interior conduit or passage 146 formed in it to enable control of air pressure within its associated chamber 12. Each of the passages 146 extends generally axially of its associated drive rod 142 and has a valve 148 (FIG. 1) at its forward end. The valve 148 herein is flush with the forward surface 126 of its associated ram 122 when in closed position. An opening is formed at the rearward end 150 of each passage 146. A suitable pump 152 (FIG. 4) may be connected to the openings at the rearward ends 150 of the passages 146 to enable air pressure at the forward surface 126 of the ram 122 to be regulated. Air may be pumped forwardly to the forward surface 126 of the ram 122 to facilitate release of the ram 122 from the cheese, or the pump 152 may be used in the reverse direction to decrease air pressure in the chambers 12.

Turning now to a description of the preferred method of the present invention, the first step of the method involves loading a number of relatively small pieces of cheese into the interior of one or both of the chambers 12. To load one of the chambers 12, the cover 36 is placed in its open position. After the pieces have been inserted into the chamber 12, the cover 36 is shifted to closed position and locked in place by the locking means 40.

Next, the ram assembly 22 is actuated to press the individual pieces of cheese together into a block or stick and force the stick forwardly within the chamber 12 so that the stick is divided into a plurality of integral extrusions of rectangular cross-section each having dimensions of approximately 0.125 in.×0.77 in. The extrusions are severed at predetermined dimensions by cutting the extrusions simultaneously at a predetermined frequency with the cutter assembly 26.

In the illustrated embodiment, the frequency of the cutter assembly 26 is set so that each shred has a dimension of approximately 0.125 in. in the direction of extrusion. It will be appreciated that this dimension is dependent upon the rate of extrusion as well as the frequency of reciprocation of the cutter 26. The speed of the ram assembly 22 and frequency of the cutter 26 preferably are independently variable so that adjustments may be made according to variations in the characteristics of the different types of cheese which may be extruded with the apparatus. The wires of the cutter assembly 26 should move through the extrusions sufficiently quickly, relative to the ram speed to provide the shreds with a substantially square cross-section.

As an alternative to the first step of the method described above, the cheese might be preformed into blocks or sticks having dimensions approximately equal to those of the chambers 12, instead of being compressed into blocks or sticks by the ram 122.

From the foregoing, it will be appreciated that the present invention provides a novel and improved method and apparatus for producing cheese shreds, which enables trim and the like to be formed into relatively small, relatively uniform shreds which are acceptable for consumer sale. The apparatus has various features to minimize damage to the cheese during operation. Use of two separate chambers 12 enables the apparatus to be used with two different types of cheese simultaneously or sequentially without intermixing. In producing shreds of different types of cheese, different ram speeds may be desirable, and sequential, rather than simultaneous, shred production may accordingly be preferable.

While a preferred embodiment has been described above and illustrated in the accompanying drawings, there is no intent to limit the scope of the invention to this or any other particular embodiment. The scope of the invention is defined by the language and spirit of the following claims.

What is claimed is:

1. Apparatus for forming a quantity of cheese into a plurality of relatively small segments of predetermined configuration, the apparatus comprising:
   an elongated chamber having one or more longitudinal interior surfaces for slidably engaging said quantity of cheese;
   an extrusion die plate defining a plurality of elongated opening formed therethrough affixed to the forward end of said chamber, each of said elongated openings having a major dimension and a minor dimension;
   ram means for forcing cheese forwardly and longitudinally of said chamber at a predetermined speed through said openings in said die plate so as to form a plurality of extrusions, one through each of said openings; and
   a cutter assembly spaced from said die plate and operable to cut through each of said extrusions at a predetermined frequency as it emerges from its associated opening to divide each extrusion into a plurality of discrete segments of predetermined dimensions, said frequency being related to said predetermined dimensions, said frequency being related to said predetermined speed of said ram means such that the dimension of said segment in the direction of extrusion is smaller than the major dimension of each of said elongated openings;
   said plurality of openings being arranged in a predetermined pattern defining a perforated area of said die plate, and including perimeter openings, each of said perimeter openings being associated with one or more perimeter surface forming a portion of the perimeter of said perforated area, each of said perimeter surfaces being substantially aligned with one of said one or more longitudinal surfaces of said chamber to prevent maceration and oiling off due to excessive working of cheese;
   the cutter assembly being movable across the die plate simultaneous with forward movement of said ram means.

2. Apparatus in accordance with claim 1 wherein each of the openings formed through the extrusion die plate is generally rectangular.

3. Apparatus in accordance with claim 2 wherein said chamber defines an interior space of generally rectangular cross section and includes a bottom wall, a pair of side walls extending upwardly along opposite sides of the bottom wall, and a cover spanning said side walls.

4. Apparatus in accordance with claim 3 wherein said cover is movable between open and closed positions to enable loading of material into said chamber.

5. Apparatus in accordance with claim 2 wherein said cutter assembly includes a plurality of wires extending generally parallel to one another adjacent the perforate area of said die plate and maintained under tension.

6. Apparatus in accordance with claim 5 wherein said cutter further comprises means for moving said wires transversely in reciprocating motion.

7. Apparatus in accordance with claim 2 wherein the ram means comprises a ram movable longitudinally of the interior of the chamber, said ram having a forward surface for engaging said quantity of cheese, and further comprises pressure control means for pumping air through the ram to the forward surface thereof to facilitate release of the ram from the cheese by controlling air pressure adjacent the forward surface of the ram within the chamber.

8. Apparatus in accordance with claim 7 wherein said cutter assembly comprises a plurality of cutting elements mounted adjacent said die plate and drive means for imparting reciprocating motion to said cutting elements.

9. Apparatus in accordance with claim 8 wherein each of said openings has dimensions of approximately 0.125 in.×0.770 in.

10. Apparatus in accordance with claim 7 wherein said cutter assembly comprises a frame slidably mounted adjacent said die plate, a plurality of cutting wires supported by said frame, and drive means for imparting reciprocating motion to said frame.

11. Apparatus in accordance with claim 10 wherein said frame includes a pair of side members and a plurality of stiffeners extending generally parallel to said side members for constraining said wires against deflection.

12. Apparatus in accordance with claim 11 wherein said openings in each perforated area of said die plate are disposed in six columns, each column containing thirteen openings, and wherein the columns are separated from one another by nonperforated areas.

13. Apparatus in accordance with claim 12 wherein said stiffeners are disposed adjacent said nonperforated areas of said die plate and are oriented so as to move longitudinally during reciprocation of the frame.

* * * * *

UNITED STATES PATENT AND TRADEMARK OFFICE
CERTIFICATE OF CORRECTION

PATENT NO. : 4,620,838

DATED : November 4, 1986

INVENTOR(S) : Roland E. Miller; Henry Borgardt; John Valek

Figure 1:
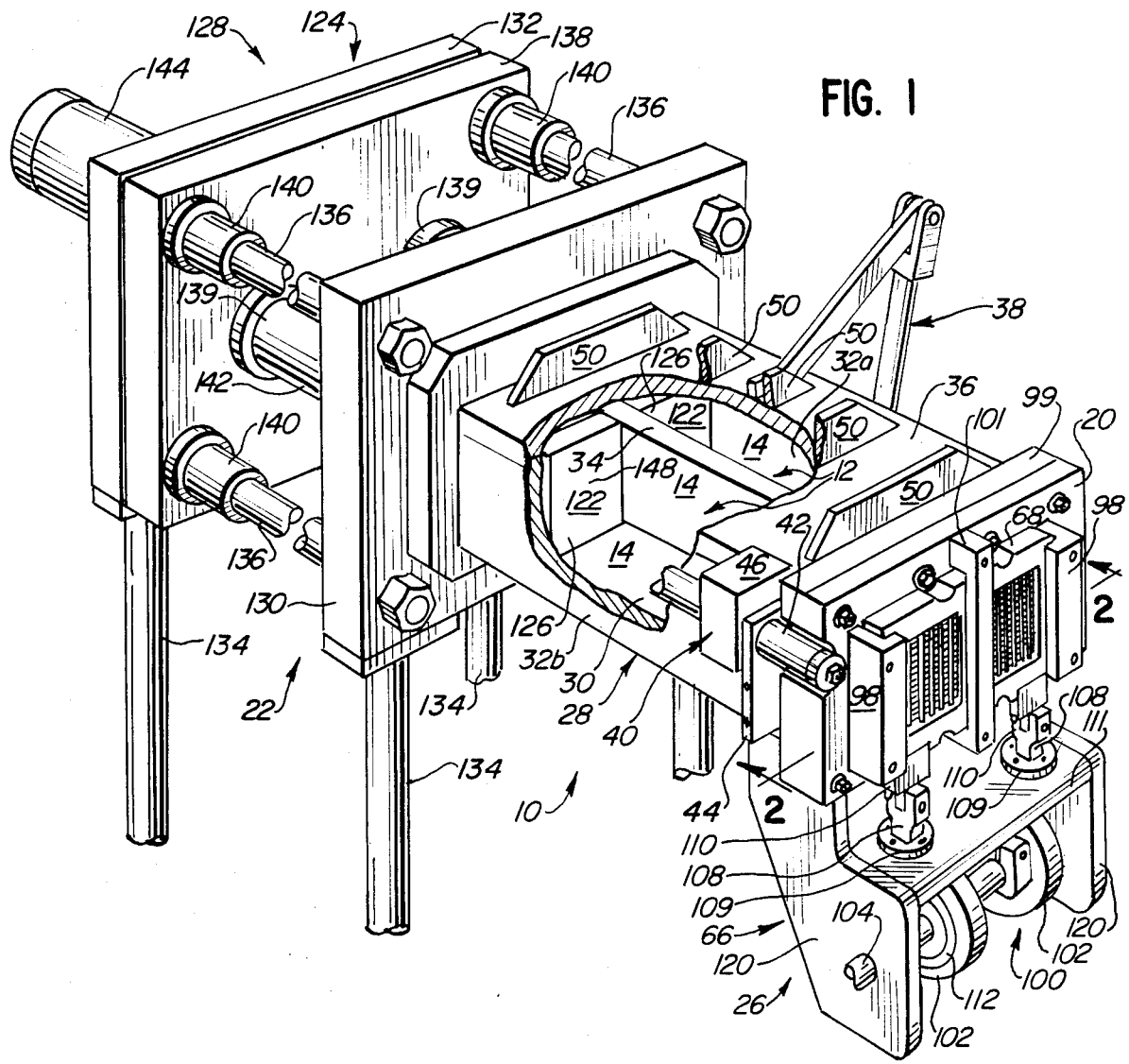
FIG. 1 is a foreshortened perspective view, with portions broken away for clarity, of extrusion apparatus in accordance with the present invention.

It is certified that error appears in the above-identified patent and that said Letters Patent is hereby corrected as shown below:

Column 2, line 41, after "FIG.1", insert a period.

Column 4, line 25, change "inveniion" to --invention--.

Column 6, line 40, change "26" to --126--.

Examiner's Amendment, column 8, line 11, change "opening"

to --openings--.

Examiner's Amendment, column 8, line 35, change "surface"

to --surfaces--.

Signed and Sealed this

Twenty-fourth Day of March, 1987

Attest:

DONALD J. QUIGG

Attesting Officer     Commissioner of Patents and Trademarks